United States Patent
Kondo

(10) Patent No.: US 9,215,634 B2
(45) Date of Patent: Dec. 15, 2015

(54) WIRELESS COMMUNICATION SYSTEM, WIRELESS COMMUNICATION METHOD, MOBILE STATION AND BASE STATION, AND CONTROL METHOD AND COMPUTER READABLE MEDIUM THEREFOR FOR DETERMINING NEIGHBOR CELLS OF CELL CORRESPONDING TO MOBILE STATION POSITION

(75) Inventor: Takayuki Kondo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 52 days.

(21) Appl. No.: 13/818,547

(22) PCT Filed: Sep. 28, 2011

(86) PCT No.: PCT/JP2011/005474
§ 371 (c)(1),
(2), (4) Date: Feb. 22, 2013

(87) PCT Pub. No.: WO2012/049813
PCT Pub. Date: Apr. 19, 2012

(65) Prior Publication Data
US 2013/0150034 A1  Jun. 13, 2013

(30) Foreign Application Priority Data

Oct. 12, 2010 (JP) ................................ 2010-230061

(51) Int. Cl.
*H04W 36/00* (2009.01)
*H04W 24/02* (2009.01)

(52) U.S. Cl.
CPC .......... *H04W 36/0083* (2013.01); *H04W 24/02* (2013.01); *H04W 36/0061* (2013.01)

(58) Field of Classification Search
CPC ....... H04W 8/02; H04W 16/04; H04W 16/24; H04W 48/10; H04W 48/18; H04W 48/20
See application file for complete search history.

(56) References Cited

U.S. PATENT DOCUMENTS

2002/0077103 A1   6/2002   Bonta
2003/0162535 A1   8/2003   Nishiyama et al.
(Continued)

FOREIGN PATENT DOCUMENTS

CN     1937843 A     3/2007
EP     2227056 A1    9/2010
(Continued)

OTHER PUBLICATIONS

Communication dated Mar. 11, 2014, issued by the Japanese Patent Office in corresponding Application No. 2012-538558.
(Continued)

*Primary Examiner* — San Htun
(74) *Attorney, Agent, or Firm* — Sughrue Mion, PLLC

(57) ABSTRACT

A wireless communication system according to the present invention is a wireless communication system including a mobile station and a base station that wirelessly communicates with the mobile station. The wireless communication system includes area determination unit that determines, based on position information of the mobile station, which of a plurality of areas the mobile station is positioned, in which the plurality of areas are obtained by dividing a cell managed by the base station, and neighbor cell information notification unit that notifies the mobile station of neighbor cell information associated with the area where the mobile station is positioned. This configuration enables cell search for the neighbor cell at the mobile station in a smaller area than a cell corresponding to the position of the mobile station.

5 Claims, 14 Drawing Sheets

(56) References Cited

U.S. PATENT DOCUMENTS

| | | | |
|---|---|---|---|
| 2005/0215268 A1* | 9/2005 | Cheng | 455/456.1 |
| 2006/0258362 A1 | 11/2006 | Jin et al. | |
| 2007/0049286 A1* | 3/2007 | Kim et al. | 455/456.1 |
| 2009/0247150 A1* | 10/2009 | Fischer et al. | 455/425 |
| 2009/0270079 A1* | 10/2009 | Han et al. | 455/414.1 |
| 2011/0070897 A1* | 3/2011 | Tang et al. | 455/456.1 |
| 2011/0200023 A1* | 8/2011 | Murray et al. | 370/338 |

FOREIGN PATENT DOCUMENTS

| | | |
|---|---|---|
| JP | 9-261710 A | 10/1997 |
| JP | 10-336727 A | 12/1998 |
| JP | 2003-259433 A | 9/2003 |
| JP | 2010-206612 A | 9/2010 |
| WO | 2004/054283 A2 | 6/2004 |
| WO | 2009/137003 A1 | 11/2009 |

OTHER PUBLICATIONS

Communication dated Apr. 17, 2014, issued by the European Patent Office in corresponding Application No. 11832258.5.

Communication dated Sep. 22, 2015, issued by the Chinese Patent Office in corresponding Application No. 201180047994.7.

* cited by examiner

```
-- ASN1START

SystemInformationBlockType3 ::=    SEQUENCE {
cellReselectionInfoCommon          SEQUENCE {
  q-Hyst                               ENUMERATED {
                                         dB0, dB1, dB2, dB3, dB4, dB5, dB6, dB8, dB10,
                                         dB12, dB14, dB16, dB18, dB20, dB22, dB24},
  speedStateReselectionPars            SEQUENCE {
    mobilityStateParameters              MobilityStateParameters,
    q-HystSF                             SEQUENCE {
      sf-Medium                            ENUMERATED {
                                             dB-6, dB-4, dB-2, dB0},
      sf-High                              ENUMERATED {
                                             dB-6, dB-4, dB-2, dB0}
    }
  }                                                              OPTIONAL  -- Need OP
},
cellReselectionServingFreqInfo    SEQUENCE {
  s-NonIntraSearch                    ReselectionThreshold       OPTIONAL, -- Need OP
  threshServingLow                    ReselectionThreshold,
  cellReselectionPriority             CellReselectionPriority
},
intraFreqCellReselectionInfo      SEQUENCE {
  q-RxLevMin                          Q-RxLevMin,
  p-Max                               P-Max                      OPTIONAL, -- Need OP
  s-IntraSearch                       ReselectionThreshold       OPTIONAL, -- Need OP
  allowedMeasBandwidth                AllowedMeasBandwidth       OPTIONAL, -- Need OP
  presenceAntennaPort1                PresenceAntennaPort1,
  neighCellConfig                     NeighCellConfig,
  t-Reselection                       t-Reselection,
  t-ReselectionEUTRA-SF               SpeedStateScaleFactors     OPTIONAL  -- Need OP
},
lateR8NonCriticalExtension        OCTET STRING                   OPTIONAL  -- Need OP
[[ s-IntraSearch-v920 SEQUENCE -- ]]
}

-- ASN1STOP
```

Fig. 5A

SystemInformationBlockType4-2 information element

412B

```
-- ASN1START

SystemInformationBlockType4 ::=   SEQUENCE {
   intraFreqNeighCellList        IntraFreqNeighCellList OPTIONAL,   -- Need OR
   intraFreqBlackCellList        IntraFreqBlackCellList OPTIONAL,   -- Need OR
   csg-PhysCellIdRange           PhysCellIdRange        OPTIONAL,   -- Cond CSG
   lateR8NonCriticalExtension    OCTET STRING           OPTIONAL,   -- Need OP
}
                                                                          502
IntraFreqNeighCellList ::=    SEQUENCE (SIZE (1..maxCellIntra)) OF
   IntraFreqNeighCellInfo
                                                  503
IntraFreqNeighCellInfo ::=    SEQUENCE {
   physCellId,
   q-OffsetRange,
   q-OffsetCell
}

IntraFreqBlackCellList ::=    SEQUENCE (SIZE (1..maxCellBlack)) OF PhysCellIdRange

-- ASN1STOP
```

Fig. 5B

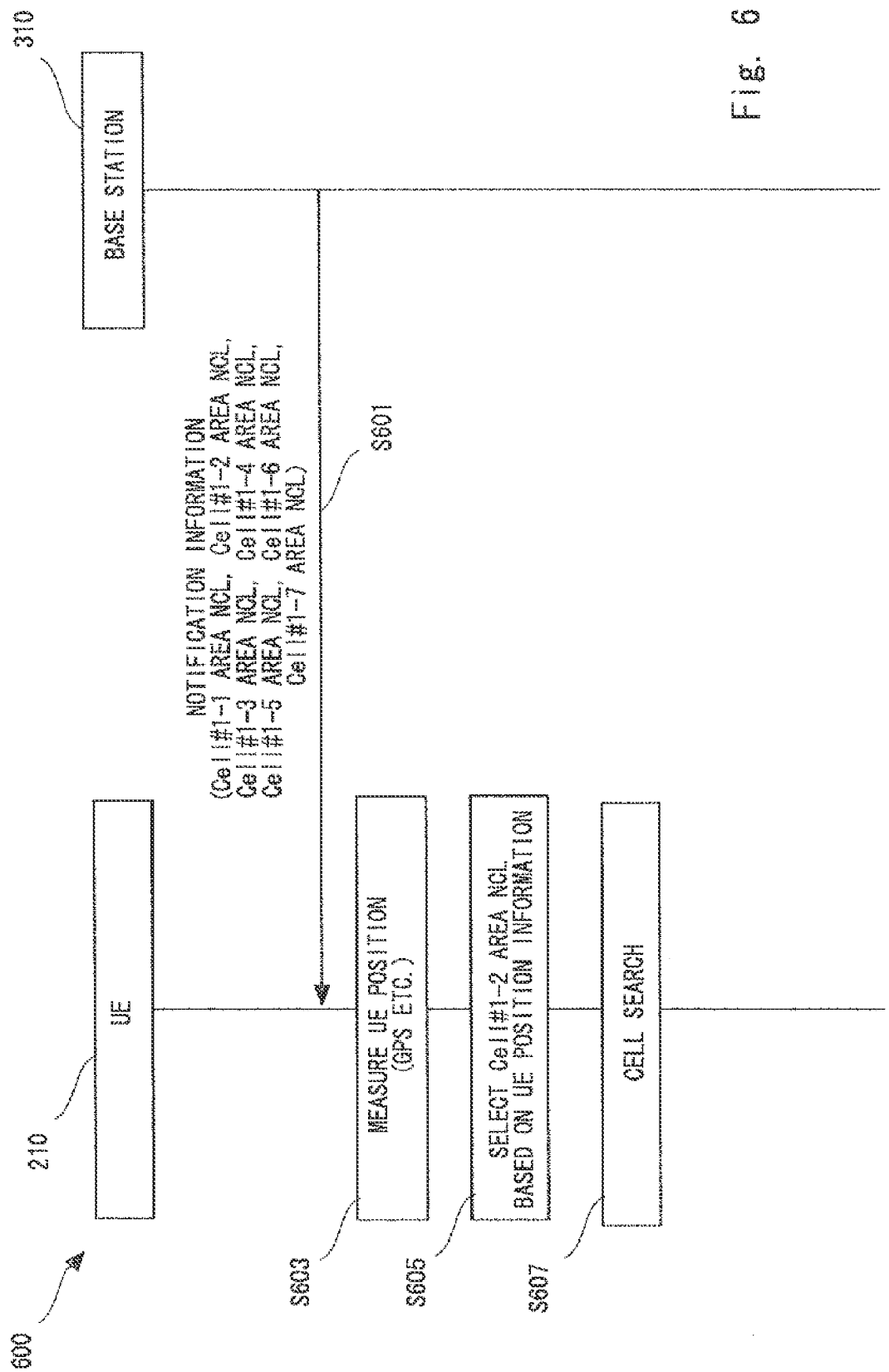

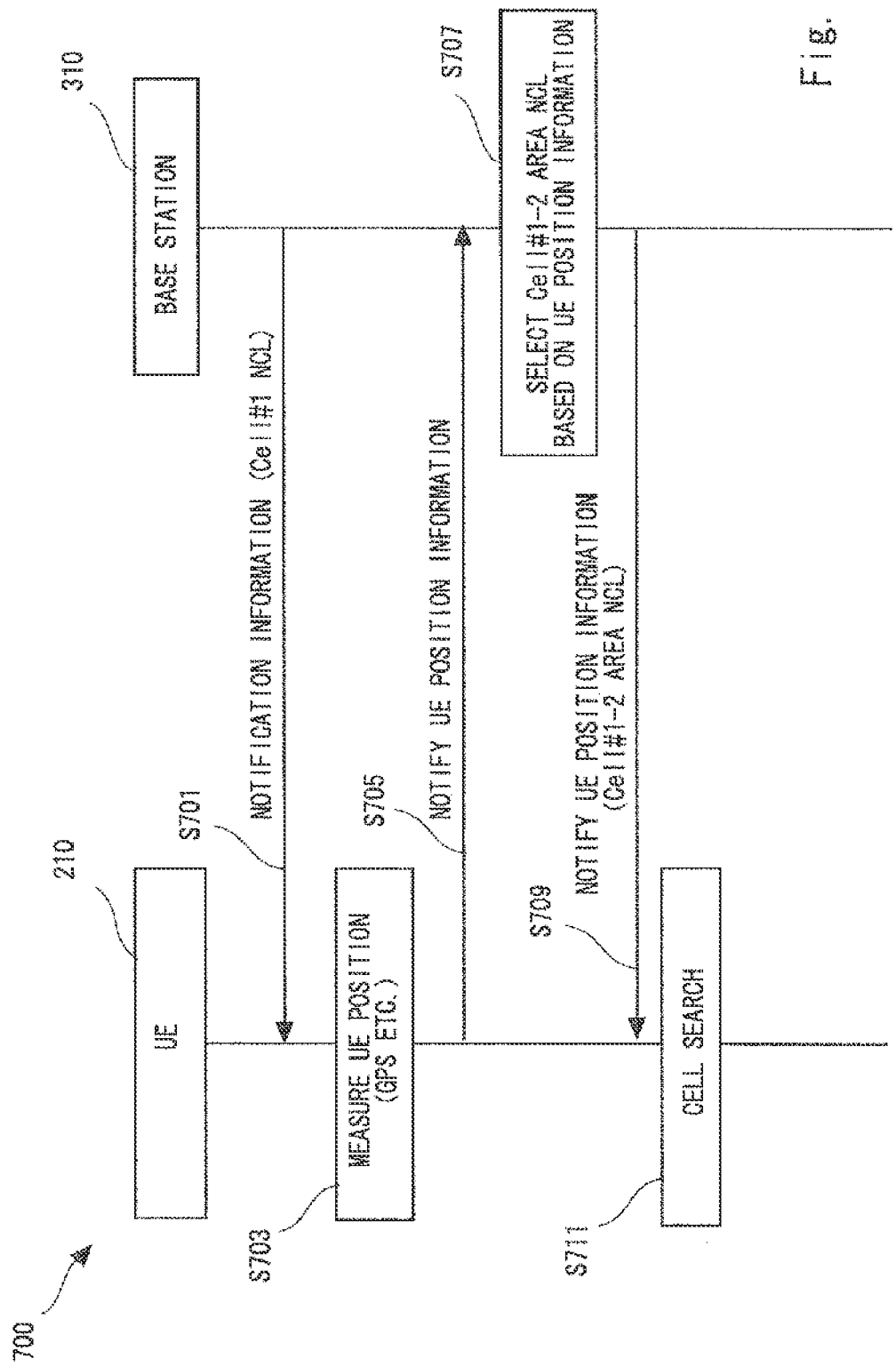

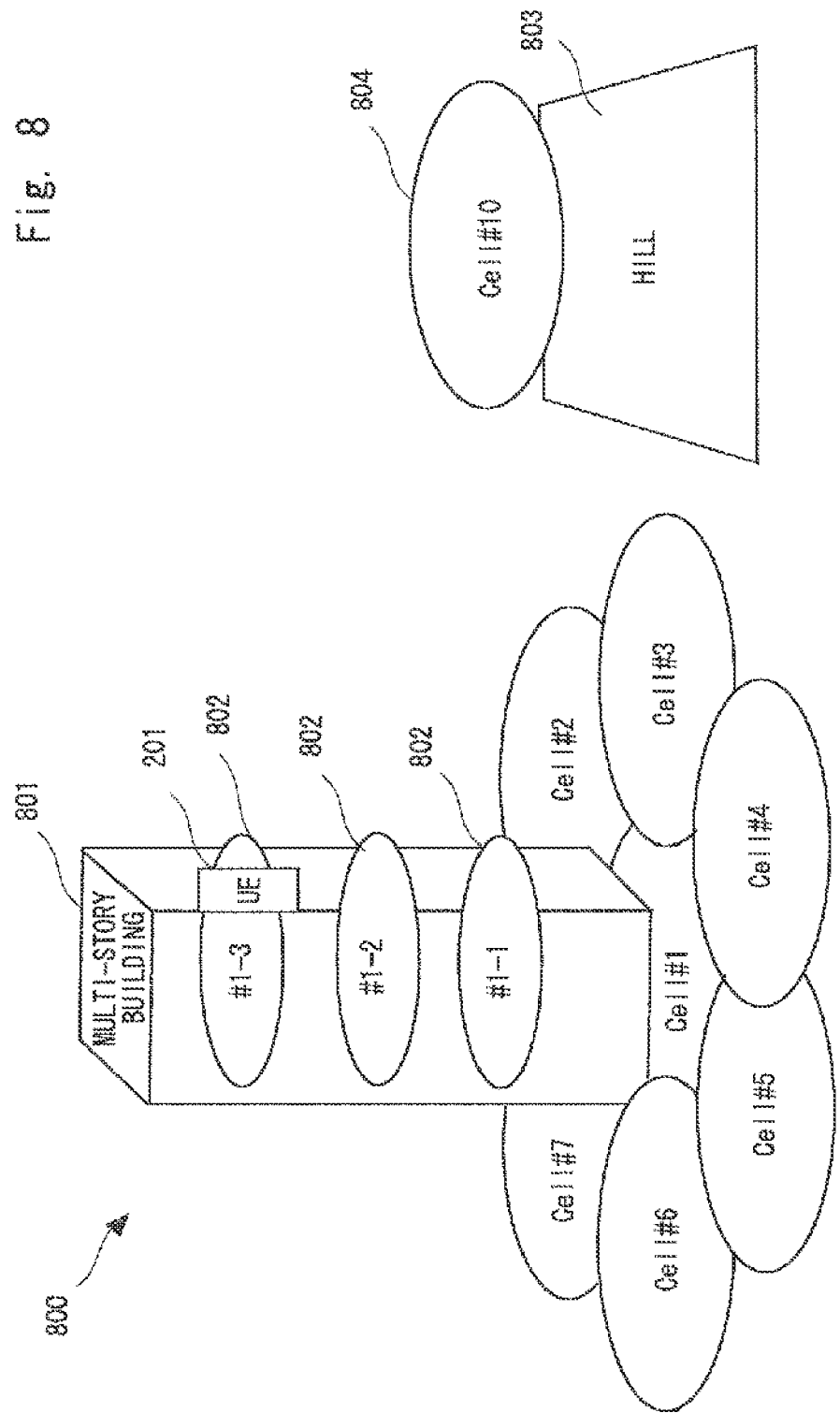

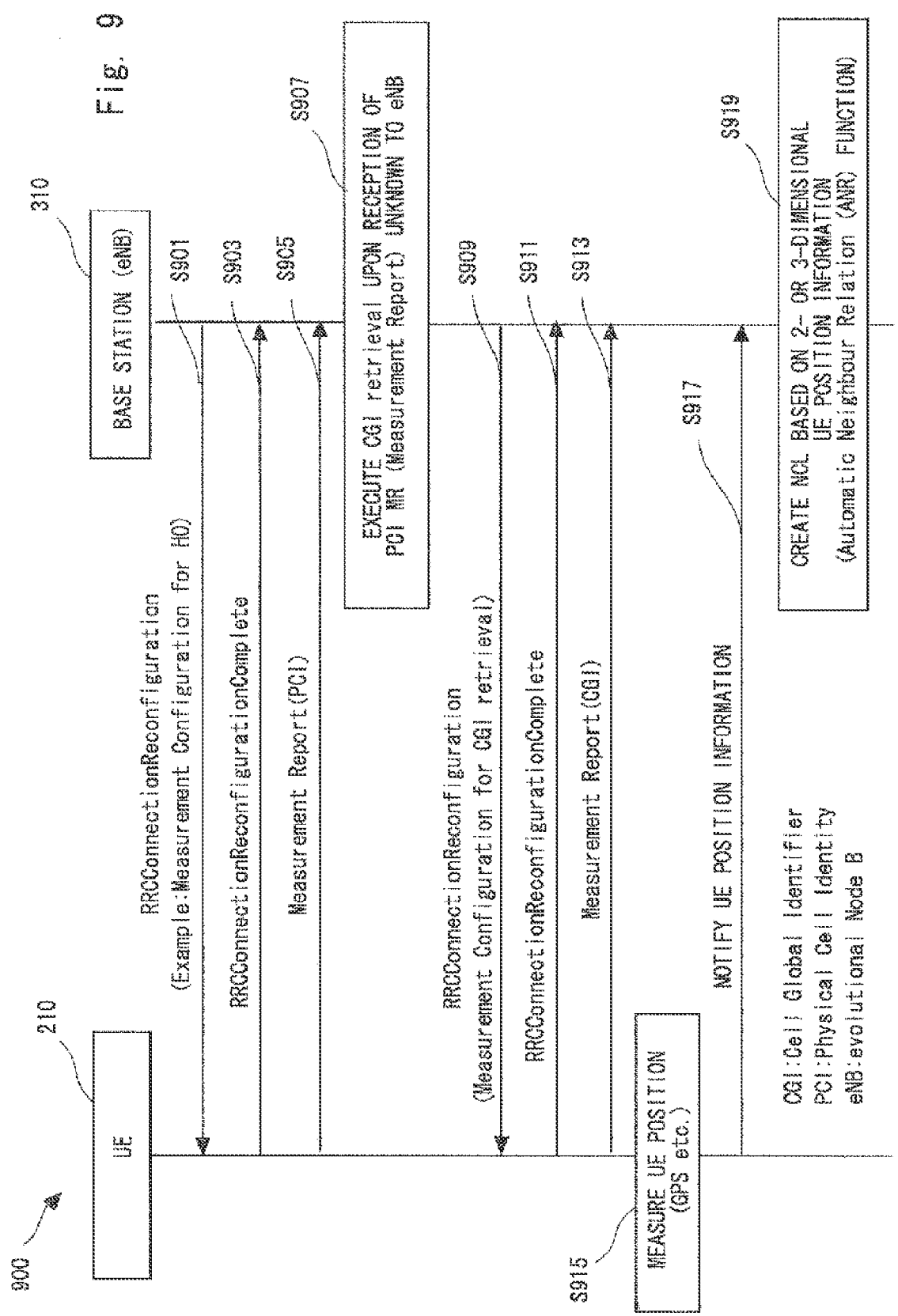

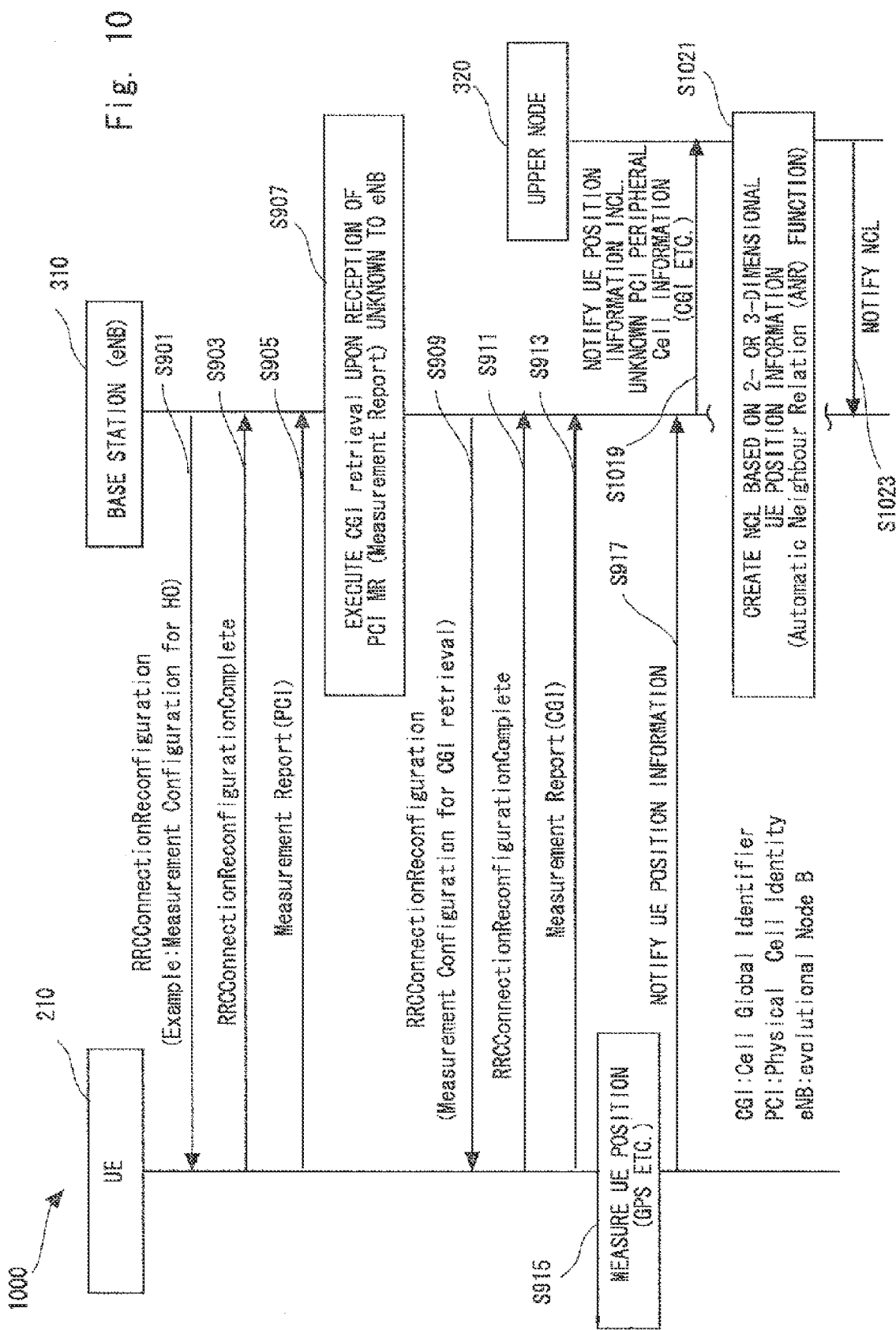

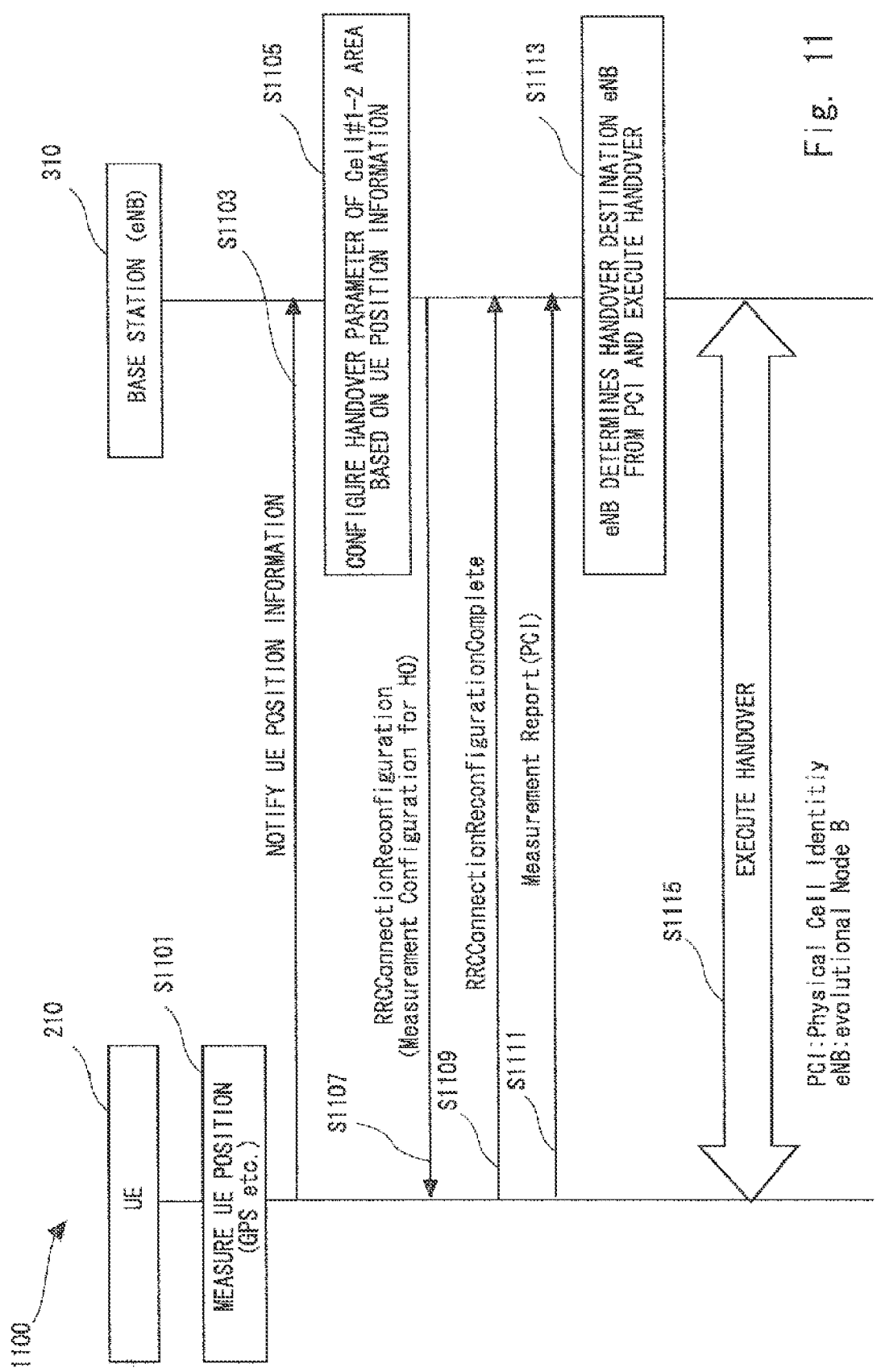

1200

*ReportConfigEUTRA-2 information element*

```
-- ASN1START

ReportConfigEUTRA ::=              SEQUENCE {
    triggerType                        CHOICE {
        event                              SEQUENCE {
            eventId                            CHOICE {
                eventA1                            SEQUENCE {
                    a1-Threshold                       ThresholdEUTRA
                },
                eventA2                            SEQUENCE {
                    a2-Threshold                       ThresholdEUTRA
                },
                eventA3                            SEQUENCE {
                    a3-Offset                          INTEGER (-30..30),
                    reportOnLeave                      BOOLEAN
                },
                eventA4                            SEQUENCE {
                    a4-Threshold                       ThresholdEUTRA
                },
                eventA5                            SEQUENCE {
                    a5-Threshold1                      ThresholdEUTRA,
                    a5-Threshold2                      ThresholdEUTRA
                },
            },
            hysteresis                         Hysteresis,
            timeToTrigger                      TimeToTrigger
        },
        periodical                         SEQUENCE {
            purpose                            ENUMERATED {
                                                   reportStrongestCells, reportCGI}
        }
    },
    triggerQuantity                    ENUMERATED {rsrp, rsrq},
    reportQuantity                     ENUMERATED {sameAsTriggerQuantity, both},
    maxReportCells                     INTEGER (1..maxCellReport),
    reportInterval                     ReportInterval,
    reportAmount                       ENUMERATED {r1, r2, r4, r8, r16, r32, r64,
infinity},
    ...,
    [[ si-RequestForHO-r9              ENUMERATED {setup}        OPTIONAL, -- Cond
reportCGI
       ue-RxTxTimeDiffPeriodical-r9    ENUMERATED {setup}        OPTIONAL -- Need
OR
    ]]
}

ThresholdEUTRA ::=                 CHOICE{
    threshold-RSRP                     RSRP-Range,
    threshold-RSRQ                     RSRQ-Range
}

-- ASN1STOP
```

1201 points to the eventId block.
1202 points to maxReportCells / reportInterval.

Fig. 12

| EVENT | CONTENT |
|---|---|
| Event A1: | Serving becomes better than absolute threshold; |
| Event A2: | Serving becomes worse than absolute threshold; |
| Event A3: | Neighbour becomes amount of offset better than serving; |
| Event A4: | Neighbour becomes better than absolute threshold; |
| Event A5: | Serving becomes worse than absolute threshold1 AND Neighbour becomes better than another absolute threshold2. |

Fig. 13

WIRELESS COMMUNICATION SYSTEM, WIRELESS COMMUNICATION METHOD, MOBILE STATION AND BASE STATION, AND CONTROL METHOD AND COMPUTER READABLE MEDIUM THEREFOR FOR DETERMINING NEIGHBOR CELLS OF CELL CORRESPONDING TO MOBILE STATION POSITION

CROSS REFERENCE TO RELATED APPLICATIONS

This application is a National Stage of International Application No. PCT/JP2011/005474, filed on Sep. 28, 2011, which claims priority from Japanese Patent Application No. 2010-230061, filed on Oct. 12, 2010, the contents of all of which are incorporated herein by reference in their entirety.

TECHNICAL FIELD

The present invention relates to a communication technique of cell control information based on a position of a mobile station.

BACKGROUND ART

In a wireless communication system, there are processes suggested to enable quick and consecutive processes and reduction of power consumption at the time of a mobile station handover (handoff). For example, in Patent Literature 1, results of cell search performed by multiple mobile stations at the time of startup or handoff are transmitted to the base station, and the base station centrally manages the results as neighbour cell information. Then, the mobile stations receive and store the neighbour cell information broadcasted from the base station as necessary, and at the time of handoff, the mobile stations select the cell to handoff without receiving the neighbour cell information. Further, in Patent Literature 2, the mobile station determines its own position using self-position information, position information of each cell, and arbitrary region information such as a cell boundary region and a weak electric field region, and performs neighbour cell base station reception level measurement and a handover process for handover. Furthermore, in Patent Literature 3, a mobile station obtains a base station of a cell where the mobile station exists and also calculates an estimated distance to another base station, detects the position of the own mobile station with higher accuracy, and uses the highly accurate position information.

CITATION LIST

Patent Literature

[Patent Literature 1] Japanese Unexamined Patent Application Publication No. 2003-259433
[Patent Literature 2] Japanese Unexamined Patent Application Publication No. 09-261710
[Patent Literature 3] Japanese Unexamined Patent Application Publication No. 10-336727

SUMMARY OF INVENTION

Technical Problem

However, in the wireless communication system according to the related art, the neighbour cell information is managed by the unit of cell, thus the mobile station cannot obtain the neighbour cell information corresponding to smaller areas in the cell. Therefore, even when the cell is close to the position of the mobile station, the cell information is not included in the neighbour cell information unless the cells are neighbour to each other, thus the cell is excluded from cell search. Moreover, since the parameters of the cell search for the neighbour cell by the mobile station are also notified by the unit of cell, it is not possible to generate the neighbour cell information corresponding to the smaller areas in the cell.

An object of the present invention is to provide a technique to solve the above problems.

Solution to Problem

In order to achieve the above object, a system according to the present invention is a wireless communication system including a mobile station and a base station that wirelessly communicates with the mobile station. The wireless communication system includes area determination means that determines, based on position information of the mobile station, which of a plurality of areas the mobile station is positioned, the plurality of areas being obtained by dividing a cell managed by the base station, and neighbour cell information notification means that notifies the mobile station of neighbour cell information associated with the area where the mobile station is positioned.

In order to achieve the above object, a method according to the present invention is a wireless communication method using a wireless communication system including a mobile station and a base station that wirelessly communicates with the mobile station. The wireless communication method includes an area determination step for determining, based on position information of the mobile station, which of a plurality of areas the mobile station is positioned, in which the plurality of areas are obtained by dividing a cell managed by the base station, and a neighbour cell information notification step for notifying the mobile station of neighbour cell information associated with the determined area where the mobile station is positioned.

In order to achieve the above object, an apparatus according to the present invention is a mobile station that wirelessly communicates with a base station. The mobile station includes reception means that receives neighbour cell information associated with each of a plurality of areas from the base station, in which the plurality of areas are obtained by dividing a cell managed by the base station, area determination means that determines, based on an area center of the plurality of areas notified from the base station in advance, the area including the area center closest to a position of the mobile station as an area where the mobile station is positioned, and selection means that selects the neighbour cell information associated with the area where the mobile station is positioned, in which the area is determined by the area determination means.

In order to achieve the above object, a method according to the present invention is a control method of a mobile station that wirelessly communicates with a base station. The control method includes a reception step for receiving from the base station neighbour cell information associated with each of a plurality of areas, in which the plurality of areas are obtained by dividing a cell managed by the base station, an area determination step for determining, based on an area center of the plurality of areas notified from the base station in advance, the area including the area center closest to a position of the mobile station as an area where the mobile station is positioned, and a selection step for selecting the neighbour cell information associated with the area where the mobile station is positioned, in which the area is determined in the area determination step.

In order to achieve the above object, a computer readable medium according to the present invention is a non-transitory computer readable medium storing a control program. The control program causes a computer to execute a reception step for receiving from the base station neighbour cell information associated with each of a plurality of areas, in which the plurality of areas are obtained by dividing a cell managed by the base station, an area determination step for determining, based on an area center of the plurality of areas notified from the base station in advance, the area including the area center closest to a position of the mobile station as an area where the mobile station is positioned, and a selection step for selecting the neighbour cell information associated with the area where the mobile station is positioned, in which the area is determined in the area determination step.

In order to achieve the above object, an apparatus according to the present invention is a base station that wirelessly communicates with a mobile station. The base station includes area determination means that determines an area including an area center closest to a position of the mobile station as an area where the mobile station is positioned among a plurality of areas, in which the plurality of areas are obtained by dividing a cell managed by the base station, and the position of the mobile station is notified from the mobile station, and notification means that notifies the mobile station of neighbour cell information associated with the area where the mobile station is positioned, in which the area is determined by the area determination means.

In order to achieve the above object, a method according to the present invention is a control method of a base station that wirelessly communicates with a mobile station that includes an area determination step for determining an area including an area center closest to a position of the mobile station among a plurality of areas as an area where the mobile station is positioned, in which the plurality of areas are obtained by dividing a cell managed by the base station, and the position of the mobile station is notified from the mobile station, and a notification step for notifying the mobile station of neighbour cell information associated with the area where the mobile station is positioned, in which the area is determined in the area determination step.

In order to achieve the above object, a computer readable medium according to the present invention is a non-transitory computer readable medium storing a control program of a base station that wirelessly communicates with a mobile station. The control program causes a computer to execute an area determination step for determining an area including an area center closest to a position of the mobile station among a plurality of areas as an area where the mobile station is positioned, in which the plurality of areas are obtained by dividing a cell managed by the base station, and the position of the mobile station is notified from the mobile station, and a notification step for notifying the mobile station of neighbour cell information associated with the area where the mobile station is positioned, in which the area is determined in the area determination step.

Advantageous Effects of Invention

According to the present invention, the mobile station can perform cell search for neighbour cells of a smaller area than a cell based on a position of a mobile station.

BRIEF DESCRIPTION OF DRAWINGS

FIG. 5A shows a configuration included in an area NCL according to the second exemplary embodiment of the present invention;

FIG. 5B shows a configuration included in the area NCL according to the second exemplary embodiment of the present invention;

FIG. 6 is a sequence diagram showing an operation procedure of the wireless communication system according to the second exemplary embodiment of the present invention;

FIG. 7 is a sequence diagram showing an operation procedure of a wireless communication system according to a third exemplary embodiment of the present invention;

FIG. 8 is a block diagram showing a configuration of a wireless communication system according to a fourth exemplary embodiment;

FIG. 9 is a sequence diagram showing an operation procedure of a wireless communication system according to a fifth exemplary embodiment;

FIG. 10 is a sequence diagram showing an operation procedure of a wireless communication system according to a sixth embodiment of the present invention;

FIG. 11 is a sequence diagram showing an operation procedure of a wireless communication system according to a seventh embodiment of the present invention;

FIG. 12 shows a configuration of parameters for creating an area NCL or for handover detection according the fifth to seventh exemplary embodiments; and FIG. 13 explains event contents of the parameters for creating the area NCL or for handover detection according to the fifth to seventh exemplary embodiments.

DESCRIPTION OF EMBODIMENTS

Hereinafter, exemplary embodiments of the present invention are illustrated in detail with reference to the drawings. However, the components explained in the following exemplary embodiments are merely illustrative, and it is not intended to limit the technical scope of the present invention thereto. The wording "cell" used in this specification also indicates a so-called "sector". That is, in the following specification, the wording of the "cell" can be read as the "sector", and in that case, an "area" indicates a region obtained by subdividing one "sector". In other words, the concepts of the so-called "sector" and the "area" in this specification are completely different from each other, and one "area" may be across multiple "sectors".

First Exemplary Embodiment

Figure 1:
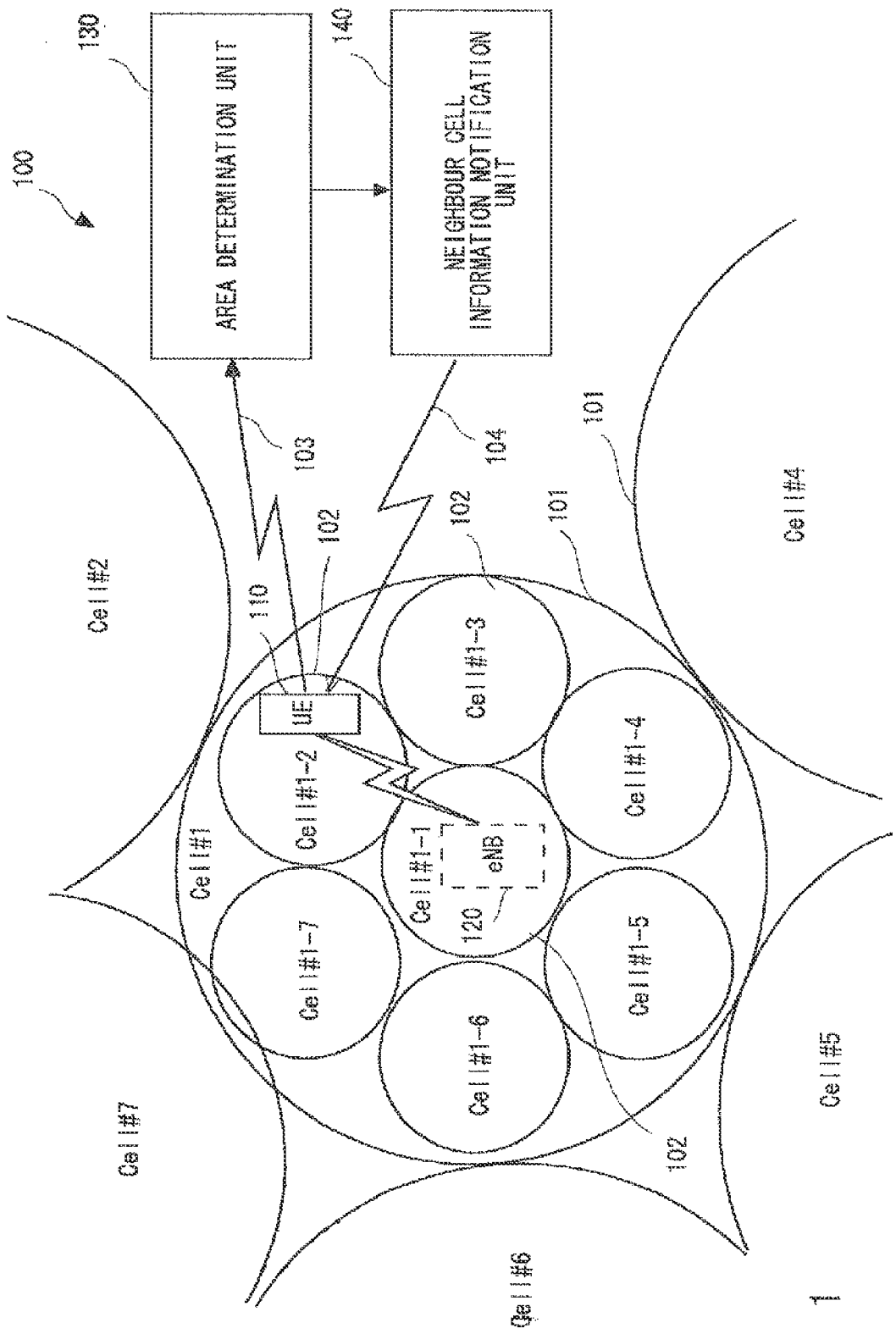
FIG. 1 is a block diagram showing a configuration of a wireless communication system according to a first exemplary embodiment of the present invention.

A wireless communication system 100 as a first exemplary embodiment of the present invention is explained using FIG. 1. The wireless communication system 100 is a system including a mobile station 110 and a base station 120 that wirelessly communicates with the mobile station 110. As shown in FIG. 1, the wireless communication system 100 includes an area determination unit 130 and a neighbour cell information notification unit 140. The area determination unit 130 determines, based on position information 103 of the mobile station 110, which of multiple areas 102, that are obtained by dividing a cell 101, the mobile station 110 is positioned. The neighbour cell information notification unit 140 notifies the mobile station 110 of neighbour cell information 104 associated with the area determined by the area determination unit 130 in which the mobile station 110 is positioned.

According to this exemplary embodiment, the cell can be further subdivided into the areas, and the neighbour cell information is generated for each subdivided area to be notified to the mobile station, thereby enabling cell search at the mobile station for neighbour cells in a smaller area than the cell based on the mobile station position.

Second Exemplary Embodiment

A second exemplary embodiment explains processes in a wireless communication system composed of a mobile station that is positioned in one of subdivided areas in a cell and a base station that controls the cell. In this exemplary embodiment, the mobile station has neighbour cell information for each area, determines an area including an own station position, and performs cell search based on the neighbour cell information associated with the determined area. According to this exemplary embodiment, it is possible to eliminate notification time of the neighbour cell information from the base station to the mobile station at the time of handover, and thereby reducing the power consumption of the mobile station. Note that in the subsequent exemplary embodiments, the neighbour cell information is also referred to as an NCL (Neighbour Cell List). Moreover, the position of the mobile station and a cell center are represented by two-dimensional (latitude and longitude) or three-dimensional (latitude, longitude, and altitude) coordinates.

<Configuration of the Wireless Communication System According to the Second Exemplary Embodiment>

Figure 2:
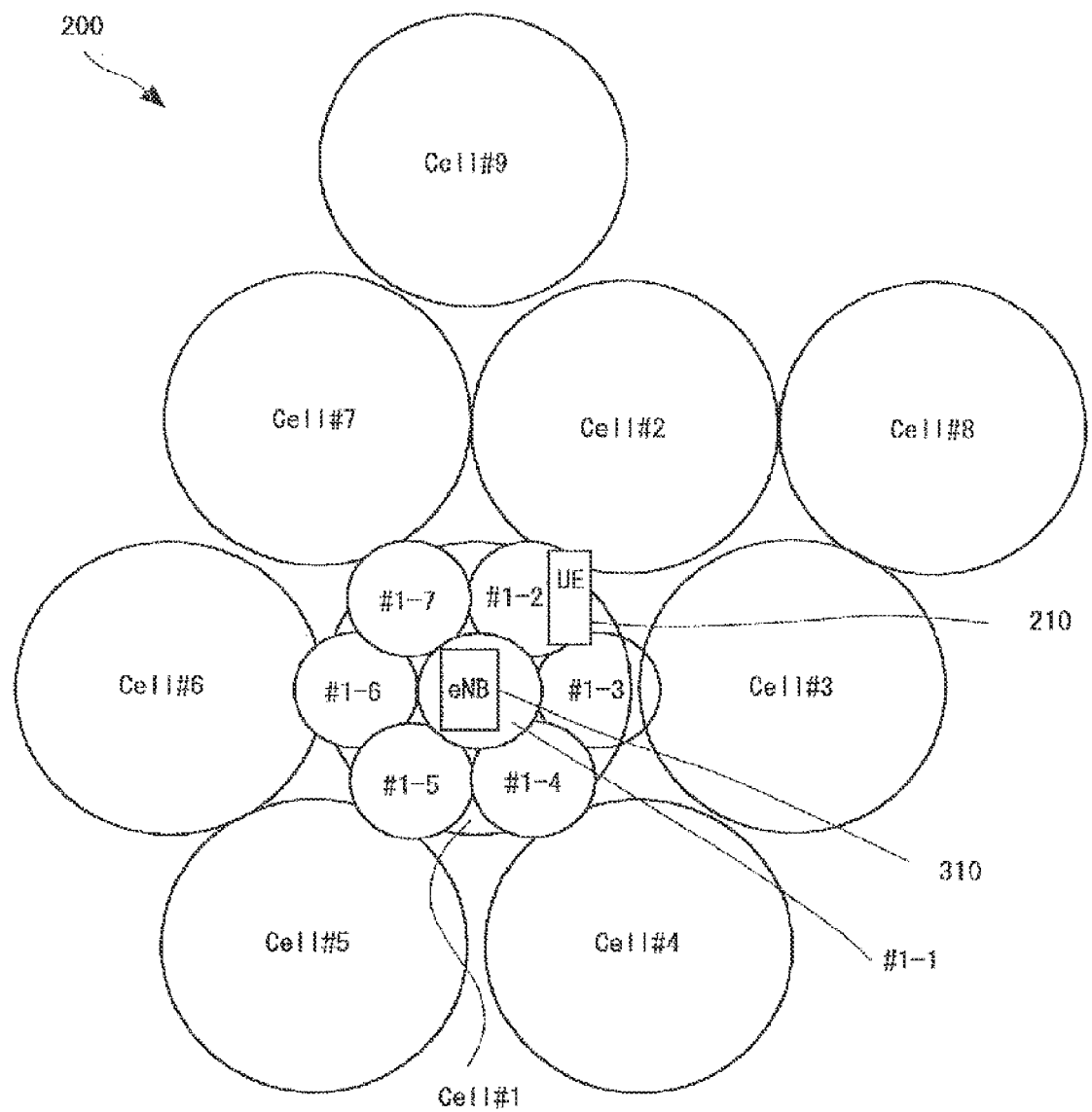
FIG. 2 is a block diagram showing a configuration of a wireless communication system according to a second exemplary embodiment of the present invention.

FIG. 2 is a block diagram showing a configuration of a wireless communication system 200 according to the second exemplary embodiment. Note that the mobile station is also referred to as a UE (User Equipment) in FIG. 2 and subsequent drawings thereof. Further, a cell is indicated by "Cell#n" and a subdivided area in the cell is indicated by "Cell#n-m".

The Cell#1 is subdivided into seven areas (Cell#1-1 to Cell#1-7) in the wireless communication system 200. There is a base station 310 in the center of the Cell#1, and a UE 210 is positioned in the area Cell#1-2. In this exemplary embodiment, a base station has neighbour cell information in association with each of the seven areas (Cell#1-1 to Cell#1-7). Therefore, the neighbour cell information associated with the Cell#1-2 (Cell#2, Cell#3, Cell#4, Cell#5, Cell#6, Cell#7, Cell#8, and Cell#9 in this example) is notified to the UE 210 that exists in the area Cell#1-2. In the method of the related art that manages the neighbour cell information by the unit of cell, neighbour cells to Cell#1 (Cell#2, Cell#3, Cell#4, Cell#5, Cell#6, and Cell#7) are considered as the neighbour cells. On the other hand, in this exemplary embodiment, Cell#8 and Cell#9 that are close to the area Cell#1-2 are further included. Note that although this exemplary embodiment illustrated an example of subdividing the Cell#1 into seven, the number of subdivision is not limited to this example. Further, although the area ranges are circle regions with the same radius, it is not necessary to have the same shape and size of the area.

Figure 3:
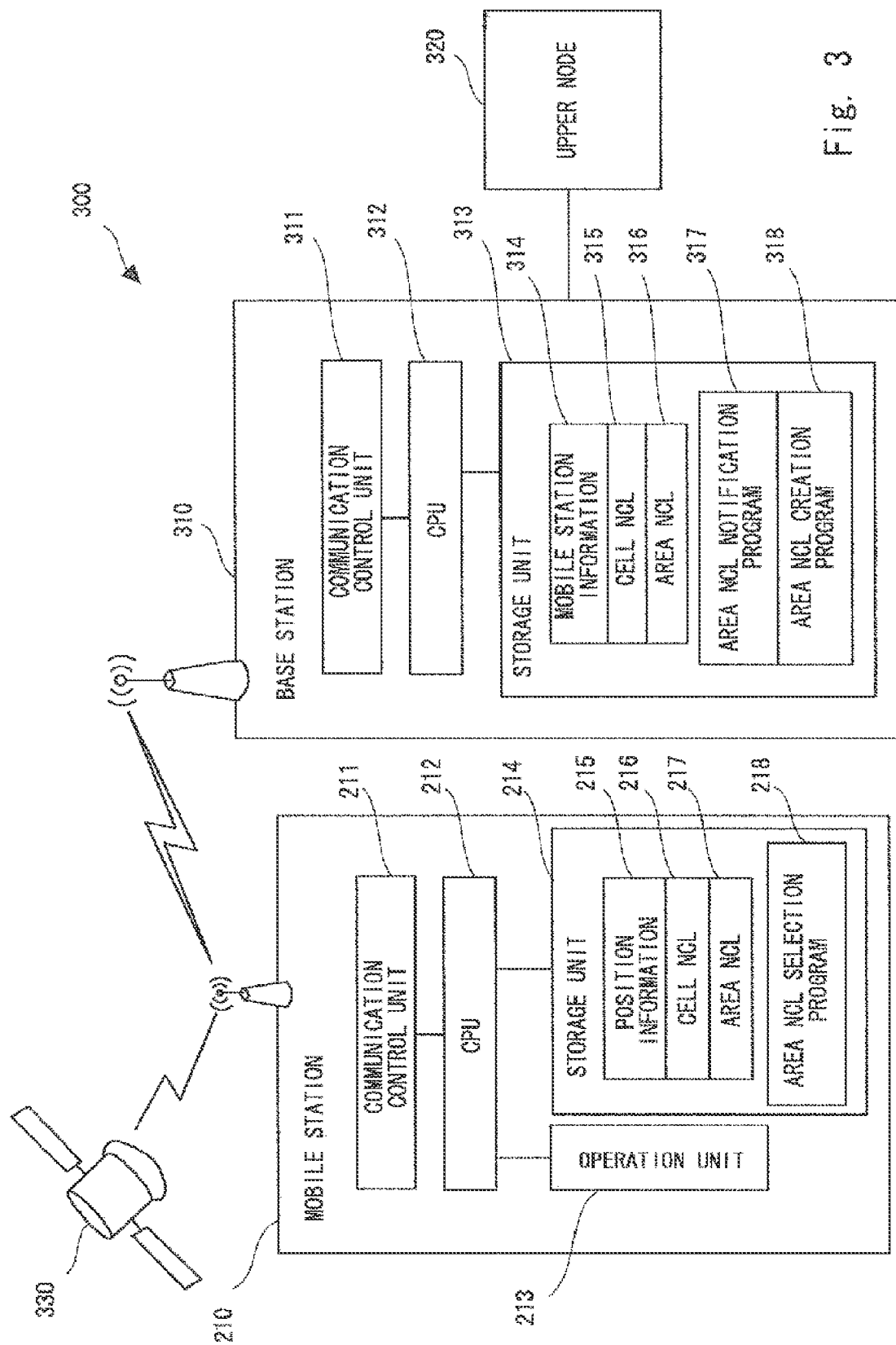
FIG. 3 is a block diagram showing a configuration of a mobile station and a base station according to the second exemplary embodiment of the present invention.

FIG. 3 is a block diagram showing a configuration of the mobile station 210 and the base station 310 regarding a wireless communication system 300 according to the second exemplary embodiment.

The wireless communication system 300 includes a GPS satellite 330 for the mobile station 210 to detect the own station position and an upper node 320 of the base station 310, in addition to the mobile station 210 and the base station 310. Note that although this example performed position detection for the mobile station 210 by the GPS, it is not limited to this. In addition, although the upper node 320 is used to create the neighbour cell information by the unit of area in a seventh exemplary embodiment, and there are for example a base station control apparatus and an existing cell management apparatus, it is not limited to these.

The mobile station 210 includes a communication control unit 211 that controls transmission and reception, a CPU 212 that controls the entire mobile station 210, an operation unit 213 including a display unit, keys, and buttons, and a storage unit 214 for temporal storage of the CPU 212 or holding data and programs. Note that the storage unit 214 includes a volatile memory and a non-volatile memory. In this exemplary embodiment, the storage unit 214 stores position information 215 detected by signals from the GPS satellite 330, neighbour cell information by the unit of cell (hereinafter also referred to as a cell NCL) 216, and neighbour cell information by the unit of area (hereinafter also referred to as an area NCL) 217. Moreover, the storage unit 214 stores an area NCL selection program 218 that selects the area NCL associated with the area including a current position of the mobile station from the area NCL 217.

The base station 310 includes a communication control unit 311 that controls transmission and reception, a CPU 312 that controls the entire base station 310, and a storage unit 313 for temporal storage of the CPU 312 or holding data or programs. Note that the storage unit 313 includes a volatile memory, a non-volatile memory, and a mass storage unit. In this exemplary embodiment, the storage unit 313 stores mobile station information 314 including the position information from the mobile station 210 existing in the cell, a cell NCL 315, and an area NCL 316. Further, the storage unit 313 further stores an area NCL notification program 317 that notifies the mobile station 210 of the area NCL associated with the area including the current position of the mobile station from the area NCL 316, that is used in a third exemplary embodiment. Furthermore, the storage unit 313 stores an area NCL creation program 318 that creates the area NCL 316 from cell information collected from the mobile stations in each area used in a fifth exemplary embodiment.

Figure 4:
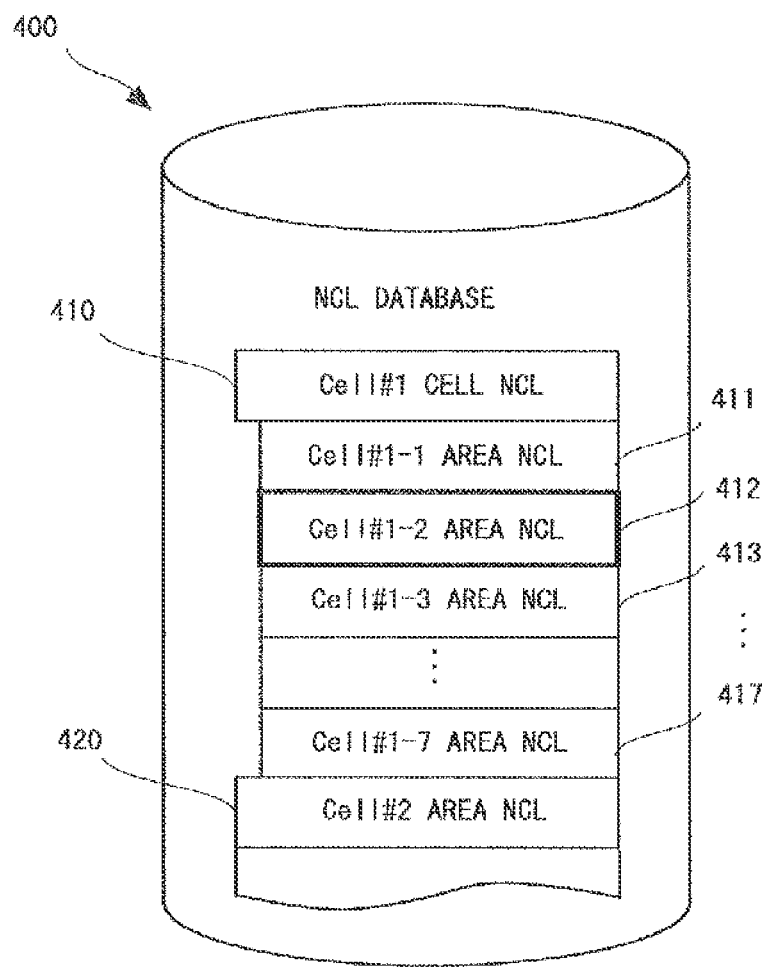
FIG. 4 shows a configuration of an NCL database according to the second exemplary embodiment of the present invention.

FIG. 4 shows a configuration of an NCL database 400 according to the second exemplary embodiment. The NCL database 400 corresponds to the cell NCL 216 and the area NCL 217 or the cell NCL 315 and the area NCL 316 in FIG. 3.

The NCL database 400 includes Cell#1 NCL 410 and Cell#2 NCL 420 that store the NCLs by the unit of cell. A configuration of this Cell#n NCL complies with "3GPP TS 36.331 V9.3.0 (2010-06) (3rd Generation Partnership Project; Technical Specification Group Radio Access Network; Evolved Universal Terrestrial Radio Access (E-UTRA) Radio Resource Control (RRC); Protocol specification (Release 9))". For example, the Cell#n NCL may be held, updated, or notified in the format of "SystemInformationBlockType3" and "SystemInformationBlockType4".

Additionally, the NCL database 400 includes a Cell#1-1 area NCL 411, a Cell#1-2 area NCL 412, a Cell#1-3 area NCL 413, . . . , and a Cell#1-7 area NCL 417 that store the NCLs by the unit of area. As shown in FIG. 2, in this example, the UE 210 is positioned in the area Cell#1-2, and the Cell#1-2 area NCL 412 is indicated with the bold line. Although FIG. 4 shows the area NCLs only for the Cell#1, the area NCLs are stored for other Cell#n. This Cell#n-m area NCL is held or notified by providing data in the format of the above "SystemInformationBlockType4" for the number of areas. This configuration realizes this exemplary embodiment in a standard LTE (Long Term Evolution) system. Note that although this exemplary embodiment explains LTE standard as an example, this exemplary embodiment can be applied to other wireless communication systems.

Example of the Cell#1-2 Aarea NCL: SystemInformationBlockType3-2

FIG. 5 shows one configuration included in the Cell#1-2 area NCL 412. The Cell#1-2 area NCL 412 includes "SystemInformationBlockType3-2" 412A. For example, "Cell Reselection Info" (cell reselection information) is described in 501 in FIG. 5A. This "SystemInformationBlockType3-2" 412A is created and held or updated, and notified to the UE 210 positioned in the area Cell#1-2 for collection of the neighbour cell information. In this exemplary embodiment shown in FIG. 2, conditions to be the neighbour cell in the area Cell#1-2 is described in the "Cell Reselection Info". In this example, the cell Cell#1 is subdivided into seven areas Cell#1-1 to Cell#1-7. Therefore, in association with each area, "SystemInformationBlockType3-1" to "SystemInformationBlockType3-7" is prepared for the Cell#1-2 area NCL 412 of the base station 310.

Example of the Cell#1-2 Area NCL: SystemInformationBlockType4-2

FIG. 5B shows another configuration included in the Cell#1-2 area NCL 412. The Cell#1-2 area NCL 412 includes "SystemInformationBlockType4-2" 412B. For example, in FIG. 5B, "NeighCellList" (neighbour cell list) is described in 502, and "NeighCellInfo" (each piece of neighbour cell information) is described in 503. This "SystemInformationBlockType4-2" 412B is created and held or updated, and notified to the UE 210 positioned in the area Cell#1-2 for cell search. In this exemplary embodiment shown in FIG. 2, the Cell#2 to Cell#9 are described in the "NeighCellList", and each information of the Cell#2 to Cell#9 is described in the "NeighCellInfo". In this example, the cell Cell#1 is subdivided into seven areas Cell#1-1 to Cell#1-7. Accordingly, in association with each area, "SystemInformationBlockType4-1" to "SystemInformationBlockType4-7" is prepared for the Cell#1-2 area NCL 412 of the base station 310.

Although this exemplary embodiment used the data in the format of "SystemInformationBlockType4" for holding and notifying the neighbour cell information associated with the area, other format of data, for example "SystemInformationBlockType3" can be also used.

<Operation Procedure of the Wireless Communication System According to the Second Exemplary Embodiment>

FIG. 6 is a sequence diagram showing an operation procedure of a wireless communication system 600 according to the second exemplary embodiment. Note that the cell NCL and the area NCL are assumed to be already prepared in the base station 310. Moreover, the operation of the UE (mobile station) 210 and the base station 310 shall be executed respectively by the CPU 212 and the CPU 312 shown in FIG. 3 in accordance with programs.

First, in the step S601, the base station 310 notifies the UE 210 of Cell#1-1 area NCL to Cell#1-7 area NCL as notification information. This notification timing can be every predetermined period, when there is a change in the area NCL, or when the UE 210 enters the serving cell of the base station 310, for example.

Upon an event such that the UE 210 enters a cell boundary region or a weak electric field region, the UE 210 measures the current position of the UE 210 by the GPS and the like in the step S603. Next, in the step S605, the UE 210 determines an area where the own station exists from the measured current position of the UE 210, and selects the area NCL associated with the determined area. This example shown in FIG. 2 selects the Cell#1-2 area NCL 412. The determination of the area may be performed in the following manner. Coordinates (latitude, longitude, and altitude) of an area center are determined for each area in the cell by the base station 310 or the upper node 320, and are notified to the UE 210. The UE 210 determines the area with the area center closest to the UE 210 as the area where the UE 210 itself is positioned.

Next, in the step S607, cell search is performed from the Cell#1-2 area NCL 412 to the neighbour cells. After that, processes including handover are performed.

Third Exemplary Embodiment

Unlike the second exemplary embodiment, in a third exemplary embodiment, a mobile station notifies a base station of a own station position, a base station determines an area including a current position of the mobile station, and notifies the mobile station of neighbour cell information associated with the determined area. According to this exemplary embodiment, it is not necessary for the mobile station to hold the neighbour cell information associated with each area, and the base station determines the area or the neighbour cell information. This suppresses the resource consumption of the mobile station and further enables acquisition of the latest neighbour cell information.

Note that the configuration of a system and an apparatus according to the third exemplary embodiment is that, in FIG. 3, the mobile station does not include the area NCL selection program 218, but instead, the area NCL notification program 317 selected by the base station performs area determination and notification of the area NCL. Other configurations are similar to the second exemplary embodiment except this difference, thus the explanation is omitted.

Operation Procedure of a Wireless Communication System According to the Third Exemplary Embodiment FIG. 7 is a sequence diagram showing an operation procedure of a wireless communication system 700 according to the third exemplary embodiment. Note that the cell NCL and the area NCL are assumed to be already prepared in the base station 310. Moreover, the operation of the UE (mobile station) 210 and the base station 310 shall be executed respectively by the CPU 212 and the CPU 312 shown in FIG. 3 in accordance with the program.

First, in the step S701, the base station 310 notifies the UE 210 of a cell NCL of the Cell#1 as the notification information. This timing information can be every predetermined period, when there is a change in the area NCL, or when the UE 210 enters the serving cell of the base station 310, for example.

Upon an event such that the UE 210 enters a cell boundary region or a weak electric field region, the UE 210 measures the current position of the UE 210 by the GPS and the like in the step S703. Next, in the step S705, the UE 210 notifies the base station 310 of the measured current position of the UE 210.

The base station 310 determines the area where the UE 210 exists from the received position information of the mobile station 210, and selects the area NCL associated with the determined area. The determination of the area is performed in the following manner. The base station 310 or the upper node 320 determines coordinates (latitude, longitude, and altitude) of an area center for each area in the cell, and based on the own station position information notified from the UE 210, determines the area with the area center closest to the UE 210 as the area where the UE 210 is positioned. In this example shown in FIG. 2, the Cell#1-2 area NCL 412 is selected. Next, in the step S709, the Cell#1-2 area NCL 412 is notified to the UE 210.

The UE 210 performs the cell search from the Cell#1-2 area NCL 412 to the neighbour cells in the step S711. After that, processes including the handover are performed.

Fourth Exemplary Embodiment

Unlike the second and third exemplary embodiments, in the fourth embodiment, a cell includes a three-dimensional region such as a multi-story building, and the cell of the multi-story building is subdivided into the floors to be areas. According to this exemplary embodiment, it is possible to capture a neighbour cell in a three-dimensional direction that cannot be captured in the relationship of the area in a two-dimensional direction. For this reason, a position of a mobile station, an area center, and a cell range are all represented by three-dimensional coordinates (latitude, longitude, and altitude), and the neighbour cells of the area with the altitude taken in consideration are selected and notified to the mobile station.

According to this exemplary embodiment, as the area is subdivided three-dimensionally taking height also into consideration, an exemplary advantage can be obtained in which the neighbour cells in a smaller area than the Cell based on the mobile station position can be cell-searched at a mobile station such as a multi-story building.

<Configuration of a Wireless Communication System According to the Fourth Exemplary Embodiment>

FIG. 8 is a block diagram showing a configuration of a wireless communication system 800 according to the fourth exemplary embodiment. Note that in a similar manner as FIG. 2, the mobile station is referred to as UE (User Equipment), the cell is indicated by "Cell#n", and the area subdivided inside the cell is indicated by "Cell#n-m".

In the wireless communication system 800, Cell#1 corresponding to a multi-story building 801 is subdivided into three areas 802 (Cell#1-1 to Cell#1-3). There is a base station not shown in the center of the Cell#1, and the UE 210 is positioned in the area Cell#1-3. Note that the number of subdivision is not limited to FIG. 8. In this exemplary embodiment, the base station holds the neighbour cell information in association with each of the three areas 802 (Cell#1-1 to Cell#1-3). The UE 210 existing in the area Cell#1-3 is notified of the neighbour cell information associated with the area Cell#1-3 (Cell#2, Cell#3, Cell#4, Cell#5, Cell#6, Cell#7, and Cell#10 in this example). A cell 804 of this Cell#10 is formed on a hill 803 that can be seen well from the area Cell#1-3, which is an upper floor of the multi-story building 801. Therefore, the Cell#1 is the neighbour cell for the UE 210 positioned in the area Cell#1-3. On the other hand, in the NCL communication method by the unit of cell according to the related art, the neighbour cells are (Cell#2, Cell#3, Cell#4, Cell#5, Cell#6, and Cell#7) and were unable to include Cell#10.

Note that as other configuration and operation procedure of the system and the apparatus according to the fourth exemplary embodiment are same as those of the second and third exemplary embodiments, the explanation is omitted.

Fifth Exemplary Embodiment

The above exemplary embodiments explained assuming that the NCLs by the unit of area are prepared in advance in the base station. The fifth exemplary embodiment explains a procedure to create the NCLs by the unit of area. The creation of the NCLs by the unit of area may be performed at the time of starting up the wireless communication system and at the time of start up the base station, or upon periodical update, upon reception of event information, and upon an environmental change, for example. Further, the creation of the NCLs by the unit of area may be performed in the step S707 of FIG. 7. According to this exemplary embodiment, the neighbour cell information associated with each area can be updated as necessary according to the latest communication environment.

Note that as a configuration of a system and an apparatus according to the fifth exemplary embodiment can use the configuration according to second to fourth exemplary embodiments, the explanation is omitted.

<Operation Procedure of a Wireless Communication System According to the Fifth Exemplary Embodiment>

FIG. 9 is a sequence diagram showing an operation procedure of the wireless communication system 900 according to the fifth exemplary embodiment. Note that the operation of the UE 210 and the base station 310 shall be executed respectively by the CPU 212 and the CPU 312 shown in FIG. 3 in accordance with the programs. Moreover, although FIG. 9 is explained assuming that the base station is eNB (evolutional Node B), it is not limited to this. Further, messages and the like shown in the following sequence comply the above 3GPP TS 36.331 V9.3.0 (2010-06), and they are written as they are.

First, in the step S901, the base station 310 transmits a message for peripheral cell measurement to the UE 210, for example as preparation for handover (hereinafter also referred to as HO). As the message for this peripheral cell measurement, "RRC Connection Reconfiguration" message for performing Measurement Configuration (hereinafter referred to as MC) is used. Upon successful reception of the message, the UE 210 responds to the base station 310 in the step S903 by "RRC Connection Reconfiguration Complete". Then, the UE 210 starts measurement of peripheral cells. When the UE 210 detects the peripheral cell that satisfies conditions in the "RRC Connection Reconfiguration", in the step S905, the UE 210 specifies a Physical Cell Identity (hereinafter referred to as PCI) and replies an Measurement Report (hereinafter referred to as MR) as a detection result to the base station.

When the base station 310 receives the MR including the PCI unknown to the base station 310, the base station 310 executes Cell Global Identity (hereinafter referred to as CGI) retrieval (CGI confirmation) in the step S907. First, in the step S909, the base station 310 transmits the "RRC Connection Reconfiguration" message to the UE 210, in order to perform the MC for the CGI confirmation of the unknown PCI. Upon successful reception of the message, in the step S911, the UE 210 responds to the base station 310 by the "RRC Connection Reconfiguration Complete". Then, the UE 210 starts receiving the notification information of the peripheral cell of the unknown PCI. In the step S913, the UE 210 replies to the base station 310 by the MR of the CGI as the detection result.

Further, in the step S915, the UE 210 detects the position information of the UE 210 at the time of receiving the peripheral cell of the unknown PCI by the GPS and the like, and notifies the base station 310 in the step S917.

In the step S919, the base station 310 determines the area based on the notified two or three-dimensional position information of the UE 210. Next, Automatic Neighbour Relation (ANR) for area NCLs by the unit of area is performed using the PCI received in the step S905 and the CGI received in the step S913.

Sixth Exemplary Embodiment

In a sixth exemplary embodiment, the base station transmits, to an upper network, UE position information and unknown PCI peripheral cell information (such as the CGI), and the upper node creates the NCLs by the unit of area according to the two or three-dimensional UE position information. This exemplary embodiment reduces the load on the base station and enables fast NCL creation. Note that as the configuration of a system and an apparatus according to the sixth exemplary embodiment can use the configurations of the second to fourth exemplary embodiments, the explanation is omitted.

<Operation Procedure of a Wireless Communication System According to the Sixth Exemplary Embodiment>

FIG. 10 is a sequence diagram showing an operation procedure of a wireless communication system 1000 according to the sixth exemplary embodiment. Note that the operation of the UE 210 and the base station 310 shall be executed respectively by the CPU 212 and the CPU 312 shown in FIG. 3 in accordance with the programs. Moreover, although FIG. 10 is explained assuming that the base station is eNB (evolutional Node B), it is not limited to this. Further, messages and the like shown in the following sequence comply the above 3GPP TS 36.331 V9.3.0 (2010-06), and they are written as they are.

Since the operation in the steps S901 to S917 in FIG. 10 are similar to the fifth exemplary embodiment, the explanation is omitted and subsequent operation thereof is explained below.

In the step S1019, the base station 310 transfers, to the upper node 320, the notified two or three-dimensional position information of the UE 210, the PCI received in the step S905, and the CGI received in the step S913.

In the step S1021, the upper node 320 determines the area based on the two or three-dimensional position information of the UE 210 that is transferred from the base station 310. Next, the ANR for the area NCLs by the unit of area is performed using the PCI and CGI transferred from the base station 310. In the step S1023, the upper node 320 returns the created area NCLs by the unit of area in order to notify the base station 310 thereof. Note that the upper node 320 may create the cell NCL at the same time. Note that this exemplary embodiment explained the transfer of the position information, the PCI, and the CGI from one base station 310 to the upper node 320, and the NCL creation by the upper node 320. However, information may be integrated from multiple base stations or from multiple base station control apparatuses and multiple networks in addition thereto, and an optimum cell NCL or area NCL may be created based on the integrated information.

Seventh Exemplary Embodiment

A seventh exemplary embodiment explains a procedure of handover parameter notification using the NCLs by the unit of area. According to this exemplary embodiment, by the cell search using the neighbour cell information notified in association with each area and handover parameters, it is possible to perform appropriate handover corresponding to the position of the mobile station.

Note that as the configuration of a system and an apparatus according to the fifth exemplary embodiment can use the configuration of the second to fourth exemplary embodiments, the explanation is omitted.

<Operation Procedure of a Wireless Communication System According to the Seventh Exemplary Embodiment>

FIG. 11 is a sequence diagram showing an operation procedure of a wireless communication system 1100 according to the seventh exemplary embodiment. Note that the operation of the UE 210 and the base station 310 shall be executed respectively by the CPU 212 and the CPU 312 shown in FIG. 3 in accordance with the programs. Moreover, although FIG. 11 is explained assuming that the base station is eNB (evolutional Node B), it is not limited to this. Further, messages and the like shown in the following sequence comply the above 3GPP TS 36.331 V9.3.0 (2010-06), and they are written as they are.

First, when the UE 210 enters a cell boundary region or a weak electric field region that requires handover, the UE 210 measures the own station position using the GPS and the like in the step S1101. Then, the UE 210 notifies the base station 310 of the measured own station position in the step S1103.

In the step S1105, the base station 310 determines the area from the position information of the UE 210 and notifies the UE 210 of the handover parameter of the area. First, in the step S1107, in order to perform Measurement Configuration (MC) to the UE 210, the base station 310 transmits the "RRC Connection Reconfiguration" message to the UE 210. Upon successful reception of the message, in the step S1109, the UE 210 transmits the "RRC Connection Reconfiguration Complete" to the base station 310 and starts measuring the peripheral cells. When the UE 210 detects the peripheral cell that satisfies the condition of the "RRC Connection Reconfiguration", in the S1111, the UE 210 specifies the PCI and transmits the MR to the base station.

The base station 310 determines the base station 310 to be a handover destination from the PCI received in the step S1113, and executes the handover in the step S1115.

Example of Handover Parameter: Report Config EUTRA

FIG. 12 shows "Report Config EUTRA" 1200 complying with above 3GPP TS 36.331 V9.3.0 (2010-06) as an example of the handover parameter.

In FIG. 12, 1201 is a part describing conditions of events A1 to A5 in the cell search by the UE 210. In this exemplary embodiment, the parameter of this "Report Config EUTRA" 1200 are notified for each area and transmitted to the UE 210, and the cell search by the unit of area is performed. FIG. 13 shows an overview 1300 of the contents of these events A1 to A5.

Moreover, 1202 of FIG. 12 is a parameter representing the maximum number of cells to be cell-searched. For example, in this exemplary embodiment of FIG. 2, the maximum number of cells is "eight". In the cell search by the unit of cell according to the related art, the maximum number is "six". In this exemplary embodiment, the number of neighbour cells is arbitrarily changed depending on the area according to the conditions.

The "Report Config EUTRA" 1200 may be used as the "RRC Connection Reconfiguration" message in the fifth and sixth exemplary embodiments. Note that although described in "SystemInformationBlockType4" as well, the contents of the messages used in this exemplary embodiment are one example, and other messages can be used to realize the same function.

Other Exemplary Embodiments

Note that although this exemplary embodiment explained LTE standard as an example, the wireless communication system to which this exemplary embodiment is applied is not limited in particular, and it is possible to apply various wireless communication systems including specifications specified by, for example, W-CDMA (Wideband Code Division Multiple Access), WLAN (Wireless Local Area Network), and IEEE (Institute of Electrical and Electronics Engineers) 802.16m.

Although the exemplary embodiments of the present invention have been explained in detail, a system or an apparatus combining different features included in the exemplary embodiment in any way are also included in the scope of the present invention.

Further, the present invention may be applied to the system composed of multiple devices, or may be applied to a single apparatus. Furthermore, the present invention can be also applied to the case when the control program realizing the functions of the exemplary embodiments are supplied directly or externally to a system or an apparatus. Therefore, the control program to be installed on the computer, a medium storing the control program, or a WWW (World Wide Web) server for downloading the control program are also included in the scope of the present invention.

The present invention can be described as the following supplementary notes.

(Supplementary Note 1)

A wireless communication system including a mobile station and a base station that wirelessly communicates with the mobile station, the wireless communication system comprising:

area determination means that determines, based on position information of the mobile station, which of a plurality of areas the mobile station is positioned, the plurality of areas being obtained by dividing a cell managed by the base station; and neighbour cell information notification means that notifies the mobile station of neighbour cell information associated with the area where the mobile station is positioned.

(Supplementary Note 2)

The wireless communication system according to (Supplementary note 1), wherein the base station comprises the area determination means, the area determination means determines, based on area centers of the plurality of areas notified from the base station in advance, the area including the area center closest to a position of the mobile station as an area where the mobile station is positioned, and the neighbour cell information notification means comprises:

notification means that notifies from the base station to the mobile station the neighbour cell information associated with each of the plurality of areas; and selection means that selects, at the base station, the neighbour cell information associated with the area where the mobile station is positioned, the area being determined by the area determination means.

(Supplementary Note 3)

The wireless communication system according to (Supplementary note 1), wherein the base station comprises the area determination means, the area determination means determines the area including an area center closest to the position of the mobile station notified from the mobile station as an area where the mobile station is positioned, and the neighbour cell information notification means comprises notification means that notifies from the base station to the mobile station the neighbour cell information associated with the area where the mobile station is positioned, the area being determined by the area determination means.

(Supplementary Note 4)

The wireless communication system according to any one of (Supplementary notes 1 to 3), further comprising:

transmission means that transmits from the base station to the mobile station a message for peripheral cell measurement including a condition to be a neighbour cell;

reply means that replies a detection result to the base station in response to the message, the detection result being a result of detection of a peripheral cell that satisfies the condition to be the neighbour cell detected by the mobile station; and storage means that stores identification information as the neighbour cell information in association with the area where the mobile station is positioned, the identification information being obtained by the base station and indicating the peripheral cell satisfying the condition to be the neighbour cell replied from the reply means.

(Supplementary Note 5)

The wireless communication system according to any one of (Supplementary notes 1 to 3), further comprising:

transmission means that transmits from the base station to the mobile station a message for peripheral cell measurement including a condition to be a neighbour cell;

reply means that replies a detection result to the base station in response to the message, the detection result being a result of detection of a peripheral cell that satisfies the condition to be the neighbour cell detected by the mobile station;

transfer means that transfers the detection result from the base station to an upper node;

return means that returns identification information as the neighbour cell information associated with the area where the mobile station is positioned, the identification information being obtained by the upper node and indicating the peripheral cell satisfying the condition to be the neighbour cell transferred from the transfer means; and storage means that stores the neighbour cell information associated with the area where the mobile station is positioned, the neighbour cell information being returned from the return means.

(Supplementary Note 6)

The wireless communication system according to (Supplementary note 4 or 5), further comprising means that, when the peripheral cell satisfying the condition to be the neighbour cell that is replied from the reply means includes cell identification information unknown to the base station, obtains cell global identification information included in the peripheral cell satisfying the condition to be the neighbour cell and uses the cell global identification information as the neighbour cell information associated with the area where the mobile station is positioned.

(Supplementary Note 7)

The wireless communication system according to any one of (Supplementary notes 1 to 6), further comprising handover parameter notification means that notifies the mobile station of a handover parameter associated with the area where the mobile station is positioned, the area being determined by the area determination means, wherein the handover parameter includes the neighbour cell information.

(Supplementary Note 8)

A wireless communication method using a wireless communication system including a mobile station and a base station that wirelessly communicates with the mobile station, the wireless communication method comprising:

an area determination step for determining, based on position information of the mobile station, which of a plurality of areas the mobile station is positioned, the plurality of areas being obtained by dividing a cell managed by the base station; and a neighbour cell information notification step for notifying the mobile station of neighbour cell information associated with the determined area where the mobile station is positioned.

(Supplementary Note 9)

A mobile station that wirelessly communicates with a base station comprising:

reception means that receives neighbour cell information associated with each of a plurality of areas from the base station, the plurality of areas being obtained by dividing a cell managed by the base station;

area determination means that determines, based on area centers of the plurality of areas notified from the base station in advance, the area including the area center closest to a position of the mobile station as an area where the mobile station is positioned; and selection means that selects the neighbour cell information associated with the area where the mobile station is positioned, the area being determined by the area determination means.

(Supplementary Note 10)

A control method of a mobile station that wirelessly communicates with a base station comprising:

a reception step for receiving from the base station neighbour cell information associated with each of a plurality of areas, the plurality of areas being obtained by dividing a cell managed by the base station;

an area determination step for determining, based on area centers of the plurality of areas notified from the base station in advance, the area including the area center closest to a position of the mobile station as an area where the mobile station is positioned; and a selection step for selecting the neighbour cell information associated with the area where the mobile station is positioned, the area being determined in the area determination step.

(Supplementary Note 11

A non-transitory computer readable medium storing a control program for causing a computer to execute:

a reception step for receiving from the base station neighbour cell information associated with each of a plurality of areas, the plurality of areas being obtained by dividing a cell managed by the base station;

an area determination step for determining, based on area centers of the plurality of areas notified from the base station in advance, the area including the area center closest to a position of the mobile station as an area where the mobile station is positioned; and a selection step for selecting the neighbour cell information associated with the area where the mobile station is positioned, the area being determined in the area determination step.

(Supplementary Note 12)

A base station that wirelessly communicates with a mobile station comprising:

area determination means that determines an area including an area center closest to a position of the mobile station as an area where the mobile station is positioned among a plurality of areas, the plurality of areas being obtained by dividing a cell managed by the base station, and the position of the mobile station being notified from the mobile station; and notification means that notifies the mobile station of neighbour cell information associated with the area where the mobile station is positioned, the area being determined by the area determination means.

(Supplementary Note 13)

A control method of a base station that wirelessly communicates with a mobile station comprising:

an area determination step for determining an area including an area center closest to a position of the mobile station among a plurality of areas as an area where the mobile station is positioned, the plurality of areas being obtained by dividing a cell managed by the base station, and the position of the mobile station being notified from the mobile station; and a notification step for notifying the mobile station of neighbour cell information associated with the area where the mobile station is positioned, the area being determined in the area determination step.

(Supplementary Note 14)

A non-transitory computer readable medium storing a control program of a base station that wirelessly communicates with a mobile station, the control program causing a computer to execute:

an area determination step for determining an area including an area center closest to a position of the mobile station among a plurality of areas as an area where the mobile station is positioned, the plurality of areas being obtained by dividing a cell managed by the base station, and the position of the mobile station being notified from the mobile station; and a notification step for notifying the mobile station of neighbour cell information associated with the area where the mobile station is positioned, the area being determined in the area determination step.

Note that although the above exemplary embodiments explained the present invention as hardware configuration, the present invention is not limited to this. The present invention can be also realized by causing a CPU (Central Processing Unit) to execute arbitrary processes in accordance with a computer program.

Further, the above program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The present application claims priority rights of and is based on Japanese Patent Application No. 2010-230061 filed on Oct. 12, 2010 in the Japanese Patent Office, the entire contents of which are hereby incorporated by reference.

INDUSTRIAL APPLICABILITY

The present invention is applicable to various mobile communications systems including LTE (Long Term Evolution).

REFERENCE SIGNS LIST

101 CELL
102 AREA
110 MOBILE STATION (UE)
120 BASE STATION (ENB)
130 AREA DETERMINATION UNIT
140 NEIGHBOUR CELL INFORMATION NOTIFICATION UNIT
210 MOBILE STATION (UE)
211 COMMUNICATION CONTROL UNIT
212 CPU (Central Processing Unit)
213 OPERATION UNIT
214 STORAGE UNIT
215 POSITION INFORMATION
216 CELL NCL
217 AREA NCL
218 AREA NCL SELECTION PROGRAM
310 BASE STATION (ENB)
311 COMMUNICATION CONTROL UNIT
312 CPU (Central Processing Unit)
313 STORAGE UNIT
314 MOBILE STATION INFORMATION
315 CELL NCL
316 AREA NCL
317 AREA NCL NOTIFICATION PROGRAM
318 AREA NCL CREATION PROGRAM
320 UPPER NODE
400 NCL DATABASE

The invention claimed is:

1. A wireless communication system including a mobile station and a base station that wirelessly communicates with the mobile station, the wireless communication system comprising:
an area determination unit that determines, based on position information of the mobile station, which of a plurality of areas the mobile station is positioned, the plurality of areas being obtained by dividing a cell managed by the base station; and
a neighbour cell information notification unit that notifies the mobile station of neighbour cell information associated with the area where the mobile station is positioned,
wherein the base station comprises the area determination unit and the neighbour cell information notification unit,
wherein the determination by the area determination unit includes determination of an area that is obtained by three-dimensionally subdividing the cell,
wherein the area determination unit determines, based on area centers of the plurality of areas notified from the base station in advance, the area including the area center closest to a position of the mobile station as an area where the mobile station is positioned, and
wherein the neighbour cell information notification unit comprises:
a notification unit that notifies from the base station to the mobile station the neighbour cell information associated with each of the plurality of areas;
a selection unit that selects, at the base station, the neighbour cell information associated with the area where the mobile station is positioned, the area being determined by the area determination unit;
a transmission unit that transmits from the base station to the mobile station a message for peripheral cell measurement including a condition to be a neighbour cell;
a reply unit that replies a detection result to the base station in response to the message, the detection result being a result of detection of a peripheral cell that satisfies the condition to be the neighbour cell detected by the mobile station;
a transfer unit that transfers the detection result from the base station to an upper node;
a return unit that returns identification information as the neighbour cell information associated with the area where the mobile station is positioned, the identification information being obtained by the upper node and indicating the peripheral cell satisfying the condition to be the neighbour cell transferred from the transfer unit; and
a storage unit that stores the neighbour cell information associated with the area where the mobile station is positioned, the neighbour cell information being returned from the return unit.

2. The wireless communication system according to claim 1, further comprising a unit that, when the peripheral cell satisfying the condition to be the neighbour cell that is replied from the reply unit includes cell identification information unknown to the base station, obtains cell global identification information included in the peripheral cell satisfying the condition to be the neighbour cell and uses the cell global identification information as the neighbour cell information associated with the area where the mobile station is positioned.

3. The wireless communication system according to claim 1, further comprising a handover parameter notification unit that notifies the mobile station of a handover parameter associated with the area where the mobile station is positioned, the area being determined by the area determination unit,
wherein the handover parameter includes the neighbour cell information.

4. A mobile station that wirelessly communicates with a base station comprising:
a reception unit that receives neighbour cell information associated with each of a plurality of areas from the base station, the plurality of areas being obtained by dividing a cell managed by the base station;
an area determination unit that determines, based on area centers of the plurality of areas notified from the base station in advance, the area including the area center closest to a position of the mobile station as an area where the mobile station is positioned;
a selection unit that selects the neighbour cell information associated with the area where the mobile station is positioned, the area being determined by the area determination unit;
a notification unit that notifies from the base station to the mobile station the neighbour cell information associated with each of the plurality of areas;
a transmission unit that transmits from the base station to the mobile station a message for peripheral cell measurement including a condition to be a neighbour cell;
a reply unit that replies a detection result to the base station in response to the message, the detection result being a result of detection of a peripheral cell that satisfies the condition to be the neighbour cell detected by the mobile station;

a transfer unit that transfers the detection result from the base station to an upper node;

a return unit that returns identification information as the neighbour cell information associated with the area where the mobile station is positioned, the identification information being obtained by the upper node and indicating the peripheral cell satisfying the condition to be the neighbour cell transferred from the transfer unit; and a storage unit that stores the neighbour cell information associated with the area where the mobile station is positioned, the neighbour cell information being returned from the return unit, wherein the determination by the area determination unit includes determination of an area that is obtained by three-dimensionally subdividing the cell.

5. A control method of a mobile station that wirelessly communicates with a base station comprising:

a reception step for receiving from the base station neighbour cell information associated with each of a plurality of areas, the plurality of areas being obtained by dividing a cell managed by the base station;

an area determination step for determining, based on area centers of the plurality of areas notified from the base station in advance, the area including the area center closest to a position of the mobile station as an area where the mobile station is positioned;

a selection step for selecting the neighbour cell information associated with the area where the mobile station is positioned, the area being determined in the area determination step;

a notification step that notifies from the base station to the mobile station the neighbour cell information associated with each of the plurality of areas;

a transmission step that transmits from the base station to the mobile station a message for peripheral cell measurement including a condition to be a neighbour cell;

a reply step that replies a detection result to the base station in response to the message, the detection result being a result of detection of a peripheral cell that satisfies the condition to be the neighbour cell detected by the mobile station;

a transfer step that transfers the detection result from the base station to an upper node;

a return step that returns identification information as the neighbour cell information associated with the area where the mobile station is positioned, the identification information being obtained by the upper node and indicating the peripheral cell satisfying the condition to be the neighbour cell transferred from the transfer unit; and a storage step that stores the neighbour cell information associated with the area where the mobile station is positioned, the neighbour cell information being returned from the return unit, wherein the determination by the area determination step includes determination of an area that is obtained by three-dimensionally subdividing the cell.

* * * * *